(12) United States Patent
O'Hagan

(10) Patent No.: US 12,327,159 B2
(45) Date of Patent: Jun. 10, 2025

(54) DYNAMIC IMAGE ANNOTATION USING INFRARED-IDENTIFIABLE WEARABLE ARTICLES

(71) Applicant: ZEBRA TECHNOLOGIES CORPORATION, Lincolnshire, IL (US)

(72) Inventor: James J. O'Hagan, McHenry, IL (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 18/128,895

(22) Filed: Mar. 30, 2023

(65) Prior Publication Data

US 2024/0330620 A1  Oct. 3, 2024

(51) Int. Cl.
G06K 7/10 (2006.01)
G06K 7/14 (2006.01)
G06T 7/246 (2017.01)

(52) U.S. Cl.
CPC ....... G06K 7/10366 (2013.01); G06K 7/1413 (2013.01); G06T 7/248 (2017.01); *G06T 2207/10048* (2013.01); *G06T 2207/30204* (2013.01)

(58) Field of Classification Search
CPC ... G06K 7/10366; G06K 7/1413; G06T 7/248
USPC .......................................................... 235/451
See application file for complete search history.

(56) References Cited

U.S. PATENT DOCUMENTS

| 5,588,067 A * | 12/1996 | Peterson | H04N 7/188 348/700 |
| 9,350,918 B1 * | 5/2016 | Baldwin | H04N 23/681 |
| 2015/0185731 A1 * | 7/2015 | Ham | G05B 19/41875 700/111 |
| 2016/0110610 A1 * | 4/2016 | Ikenoue | G06V 40/10 382/103 |
| 2017/0374333 A1 * | 12/2017 | Ashra | H04N 9/3185 |
| 2018/0053438 A1 * | 2/2018 | Moriguchi | G09B 23/28 |
| 2023/0081593 A1 * | 3/2023 | Caulfield | H04N 5/33 250/342 |
| 2023/0206586 A1 * | 6/2023 | Lee | G06V 10/761 382/103 |

* cited by examiner

*Primary Examiner* — Ahshik Kim

(57) ABSTRACT

A method for tracking a target within a field of view, includes: receiving, from an input device, a target identifier uniquely identifying the target; receiving, from an infrared camera, a sequence of images resulting from infrared radiation received from the target and comprising a first region of radiation received from the target at a first intensity and an adjacent region of radiation received from the field of view at a second intensity; detecting, in a reference image from the sequence, a mask defined by a border between the first region and the adjacent region; storing an association between the target identifier and the mask; detecting the mask in a further image from the sequence; and annotating the further image with the target identifier according to the stored association.

18 Claims, 12 Drawing Sheets

DYNAMIC IMAGE ANNOTATION USING INFRARED-IDENTIFIABLE WEARABLE ARTICLES

BACKGROUND

Measurement of time periods consumed by various tasks (e.g., item-handling activities such as pick tasks, packaging tasks, shelf stocking, or the like) can generate data used to optimize industrial processes, assess process performance, or the like. Detecting start and end points for such tasks, as well as intermediate stages of the tasks, however, may be difficult to automate and may therefore depend on human observation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
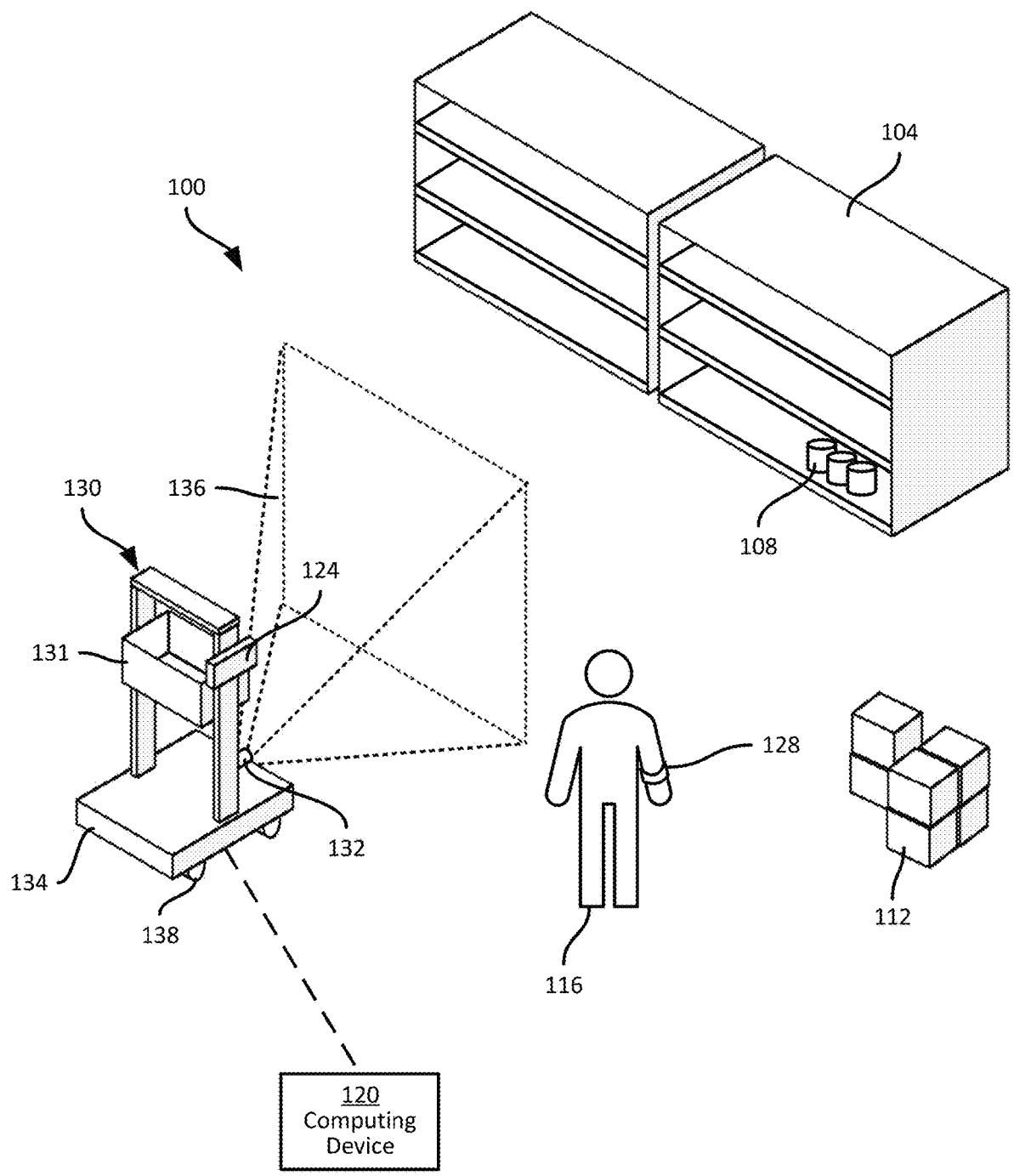
FIG. 1 is a diagram of a system for target identification.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method for tracking a target within a field of view, the method comprising: receiving, from an input device, a target identifier uniquely identifying the target: receiving, from an infrared camera, a sequence of images resulting from infrared radiation received from the target and comprising a first region of radiation received from the target at a first intensity and an adjacent region of radiation received from the field of view at a second intensity: detecting, in a reference image from the sequence, a mask defined by a border between the first region and the adjacent region: storing an association between the target identifier and the mask: detecting the mask in a further image from the sequence; and annotating the further image with the target identifier according to the stored association.

Additional examples disclosed herein are directed to a computing device for tracking a target within a field of view, the computing device comprising: a memory; and a processor configured to: receive, from an input device, a target identifier uniquely identifying the target: receive, from an infrared camera, a sequence of images resulting from infrared radiation received from the target and comprising a first region of radiation received from the target at a first intensity and an adjacent region of radiation received from the field of view at a second intensity: detect, in a reference image from the sequence, a mask defined by a border between the first region and the adjacent region: store an association between the target identifier and the mask: detect the mask in a further image from the sequence; and annotate the further image with the target identifier according to the stored association.

FIG. 1 illustrates a system 100 including, for example, a support structure 104 such as a shelf carrying a first set of items 108, as well as a staging area containing a second set of items 112. The system 100 can be implemented, for example, in a facility where items 108 (e.g., items of a first type) and 112 (e.g., items of a second type, such as packaging materials) are combined, e.g., in a packaging task. For example, to complete one instance of the packaging task, a worker 116 can retrieve one of the items 108 and one of the items 112 from the shelf 104 and the staging area, respectively, before combining or otherwise manipulating the retrieved items 108 and 112, and depositing the combined or otherwise manipulated items 108 and 112 in a designated location (e.g., on a conveyor, in a receptacle 131, or the like).

The system 100, in the illustrated example, also includes a semi-autonomous or autonomous robot 130, configured to travel the facility in which the system 100 is deployed, for example to collect and transport the items 108 and 112. The robot 130 includes a chassis 134 supporting a locomotive assembly 138, such as a set of wheels, tracks, or the like driven by one or more electric motors or other suitable propulsive mechanism. The robot 130 also includes one or more receptacles 131, e.g., supported on the chassis 134. The receptacles 131 can be the designated location in which the worker 116 places the combined and/or manipulated items 108 and 112.

The robot 130 can also include an input device 124, such as a radio frequency identification (RFID) reader, a touch screen, a barcode scanner, a magnetic stripe reader (MSR) or the like. The robot 130 can further include an infrared-sensitive camera 132, e.g., mounted in a forward-facing direction on the chassis 134, with a field of view (FOV) 136 extending away from the chassis 134. The camera 132 can be configured to capture long-wave infrared (LWIR) radiation, medium-wave infrared (MWIR) radiation, or both. As discussed below, the input device 124 and the camera 132 can be employed to monitor the performance of tasks by the worker 116 and/or by other targets (e.g., including other human subjects) in the facility in which the system 100 is deployed. In other examples, the input device 124 and/or the camera 132 can be deployed at fixed positions in the facility, e.g., instead of on a mobile platform such as the robot 130. An infrared camera 132 deployed at a fixed position may have a field of view: 136 that varies over a time period due to changes in the pan, tilt, or zoom of the camera, illumination changes, or items that enter or leave the field of view during the time period.

A wide variety of items 108, 112, can be handled by the worker 116, and in other examples the system 100 can include fewer types of items than the two types shown in FIG. 1, or more than the two illustrated types of items. Further, a wide variety of handling tasks may be performed by the worker 116 in addition to or instead of the packaging task mentioned above. Other example handling tasks performed by the worker 116 can include manufacturing tasks, repair tasks, or the like. Such tasks can be single-stage tasks (e.g., picking an item 108 to a receptacle) or multi-stage tasks including two or more subtasks, as with the packaging task noted above. For instance, a single packaging task may include subtasks such as retrieving a box 112 from the staging area, assembling the box, picking up one of the items 108 from the shelf, placing the item in the assembled box, adding fill material to the box, obtaining a piece of tape from a nearby paper tape machine, closing the box flaps, applying the obtained tape to the box flaps to seal the box, and placing the sealed box on a receptacle 131 of the robot 130 for movement to a shipping area of a facility.

The system 100 includes a computing device 120 configured to monitor the performance of tasks such as the packaging task set out above. For example, the computing device 120 can be configured to receive data from various sensors, such as the input device 124 and the camera 132, and to track the movements of the worker 116 using the collected sensor data. Based on the tracked movements of the worker 116 and the timing of such movements, the computing device 120 can be configured to identify start and end points for a task, and in some examples for various subtasks that define a task.

Mapping movements of the worker 116 with specific subtasks involves, among other functions, identifying the worker 116 in the collected sensor data, e.g., to distinguish the worker 116 from other workers that appear in the sensor data. An input device 124 may be a reader such as a barcode scanner, an RFID reader, an MSR or the like. The worker 116 may carry a target identifier distinguishing the worker 116 from other workers in the facility. The target identifier can be, for example, encoded in a data carrier such as a barcode printed or otherwise disposed on a wearable article 128 such as a wristband or a magnetic signature on a magnetic stripe laminated onto a plastic card. In an example, the data carrier can include memory in an RFID tag embedded in the article 128 and storing the target identifier. The target identifier can include an employee number, an account identifier, or the like, that uniquely identifies the worker 116 from any other workers employed or otherwise active in the facility. The target identifier may require many bits of data to meet various needs of an employer and/or operator of the facility. A large employer with many workers may require many target identifiers to uniquely identify each worker, so each target identifier may require many data bits, bytes, or characters. Some facility operators may use the target identifier both for uniquely identifying the worker and also for providing electronic access to a computer system, physical access control system, or timeclock: each target identifier may require many bits to provide data appropriate for those other systems. As a result, the data carrier for the target identifier may include a barcode with multiple elements, an RFID tag with sufficient memory, or a card with a magnetic stripe or NFC circuit configured to hold any of the target identifiers that may be used.

Associating a task instance with the worker 116, can be determined by the computing device 120. For example, when a task is initiated, the input device 124 may capture the target identifier, e.g., in response to the article 128 being placed sufficiently close to the input device 124 for decoding of a barcode or the like. A barcode reader input device may capture an image of the data carrier barcode and decode the target identifier from the captured image. An RFID reader input device may communicate with an RFID tag comprising a data carrier memory and decode the target identifier from the data communicated from the RFID tag. An MSR input device may receive a magnetic signal from a magnetic stripe on a plastic card and decode the target identifier from the magnetic signal. The target identifier can then be received by the computing device 120 and associated with task data such as a task identifier and an initial time indicating when the target identifier was captured. When the task is completed the input device 124 can be employed to repeat the capture of the target identifier and communicate the captured target identifier to the computing device 120. The computing device 120 may then associate the second data capture event with the initial task data based on the decoded data and determine an elapsed time between the initial associating and the subsequent data capture. Based on the time stamps associated with the target identifier captures, the computing device 120 can determine an elapsed time period associated with completion of the task.

Capturing the data carrier with a target identifier by the input device 124 may involve an explicit operation initiated by the worker 116, such as holding the article 128 sufficiently close to the input device 124 for barcode scanning, RFID tag reading, or the like. Because each data capture operation consumes time, this approach may therefore be unsuitable for measuring time periods elapsed for multiple tasks in a busy facility, for a complex task with multiple subtasks (e.g., intermediate stages of a task), or for tasks requiring the worker to do multiple actions with his hands. Depending on the nature of the task, the worker 116 may be unable to return frequently to the input device 124 to read the article 128, and the input device 124 may not be configured to read the article 128 from a long distance away. Further, each scan consumes some amount of time, which may impede completion of the task or result in inaccurately determining an elapsed time period.

The computing device 120 can therefore be configured to automatically detect the initiation and completion of certain tasks, without intermediate capture operations to obtain the target identifier using the input device 124. For example, as discussed below; the computing device 120 can be configured to detect the worker 116 from images captured by the camera 132. During the performance of a task, such as the packaging task set out above, the robot 130 can be positioned to direct the field of view 136 to encompass at least a portion of the space within which the worker 116 will perform the task. The camera 132 can capture a stream of images and provide the images to the computing device 120, e.g., encompassing a period of time between the initiation and the completion of a task. The computing device 120 can then process the images to detect movement patterns of the worker 116 and detect task initiation and completion times therefrom.

During the performance of a task by the worker 116, one or more other workers (who may or may not be involved in performance of the same task) may periodically be present in the field of view 136. Further, the worker 116 may be within the field of view: 136 during performance of the task, but may be too distant from the camera 132 for a barcode or other data carrier on the article 128 to be detected and/or decoded from an image of the worker 116. While targets such as human subjects (including the worker 116) may be detected via various segmentation mechanisms in images captured by the camera 132, those mechanisms may not distinguish between individual workers or other targets. Detecting initiation and completion of tasks and/or subtasks from image data captured by the camera 132, however, is dependent on identifying specific workers within the images.

The article 128 therefore includes certain structural features to facilitate detection of the article 128 in images captured by the camera 132, as well as distinguishing the article 128 from other articles worn by other workers. As discussed below, the article 128 defines a mask for infrared radiation emitted by the worker 116 (or any other infrared-emitting identification target). The mask corresponds to a predefined identifier of the article 128, e.g., stored at or otherwise accessible to the computing device 120. The article identifier may also be referred to as a mask type. Any article 128 that defines a given mask (e.g., any article 128 that produces the same pattern and/or shape of infrared radiation detectable by the camera 132 when worn) therefore has the same article identifier, or mask type. Various types of articles 128, each defining distinct masks, can be deployed in the facility. The mask facilitates both detection of the article 128 in images captured by the camera 132, and identification of the article 128 distinct from other articles.

The number of types of article 128 may be smaller than the number of workers in the facility. For example, the facility may employ hundreds or thousands or workers, to whom twenty types of article 128 (or any other number smaller than the number of distinct types of article) are distributed. While each article 128 can carry a unique target identifier corresponding to the individual worker 116 wearing the article 128, various subsets of the articles 128 define the same mask (e.g., such that twenty distinct masks are deployed in the facility, in the example above).

To identify the worker 116 (as distinct from other workers in the facility) in images from the camera 132, the computing device 120 is configured to perform various functions to dynamically determine associations between target identifiers and article identifiers. The associations determined by the computing device 120 can then be used for processing images from the camera 132 for task and subtask detection and measurement functions.

Figure 2:
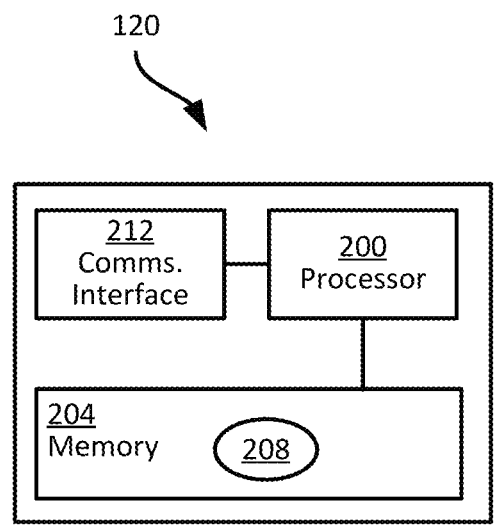
FIG. 2 is a diagram of certain internal components of the computing device of FIG. 1.

Turning to FIG. 2, certain internal components of the computing device are illustrated. The computing device 120, in the illustrated example, includes a processor 200 (e.g. a central processing unit (CPU)), interconnected with a non-transitory computer readable storage medium, such as a memory 204. The memory 204 includes a suitable combination of volatile memory (e.g., Random Access Memory or RAM) and/or non-volatile memory (e.g., read only memory or ROM, Electrically Erasable Programmable Read Only Memory or EEPROM, flash memory). The processor 200 and the memory 204 each comprise one or more integrated circuits. The memory 204 stores computer readable instructions executable by the processor 200 to perform various functionality related to the processing of data from the input device 124 and the camera 132 to determine associations between target identifiers and article identifiers.

In this example, the memory 204 stores a target identification application 208 executable by the processor 200 to perform various actions discussed herein. The memory 204 can also store one or more repositories containing captured images and/or images processed via the execution of the application 208.

The computing device 120 also includes a communications interface 212 interconnected with the processor 200. The communications interface 212 includes suitable hardware (e.g., transmitters, receivers, network interface controllers and the like) allowing the computing device 120 to communicate with other computing devices, such as the robot 130.

The computing device 120 can be implemented as a server, e.g., connected with the robot 130 via one or more networks. In some examples, the computing device 120 can be implemented at the robot 130, e.g., such that the robot 130 processes images from the camera 132 as discussed below.

Figures 3A, 3B, 3C:
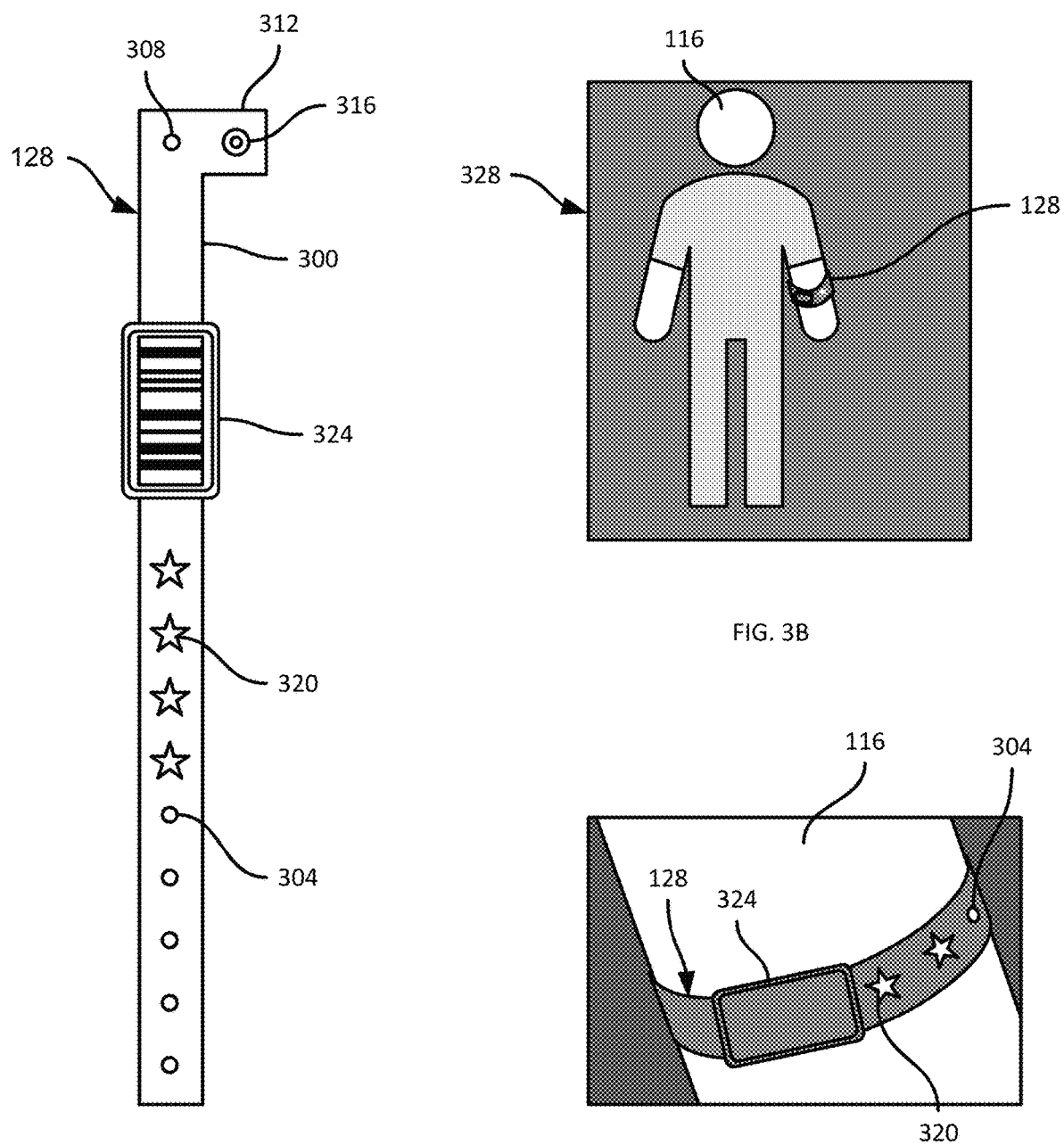
FIG. 3A is a diagram of an infrared-identifiable wearable article.
FIG. 3B is an example infrared image of a target wearing the article of FIG. 3A.
FIG. 3C is detailed view of a portion of the image of FIG. 3B.

Referring to FIG. 3A, an example article 128 is illustrated, in the form of a wristband. The articles worn by the worker 116 and other workers in the facility can take various forms other than wristbands, in some examples, including headwear (e.g., hard hats), gloves, safety vests, gloves, and the like.

The article 128 includes a body 300 wearable by an identification target including a human subject, such as the worker 116. The body 300 can include a clasping mechanism defined by a set of adjustment holes 304 extending through the body 300, a locking hole 308, and a tab 312 carrying a fastener 316. The body 300 can be shaped into a loop (e.g., around a wrist of the worker 116), and the locking hole 308 can be aligned with one of the adjustment holes 304, following which the tab 312 can be folded over to push the fastener 316 through the aligned locking hole 308 and adjustment hole 304. A variety of other mechanisms can also be employed to affix the article 128 to the worker 116.

The article 128 defines a mask for target-emitted infrared radiation via distinct portions with different opacities to infrared radiation. Some portions of the article 128 have a first opacity to infrared radiation, while other portions of the article 128 have a second opacity to infrared radiation, smaller than the first opacity. When the article 128 is worn by the worker 116, the portions with the second opacity allow the passage of a greater proportion of infrared radiation generated by the worker 116 (e.g., as body heat) than allowed by portions of the article 128 with the first opacity. The differential passage of infrared radiation from the worker 116 through the article 128 can generate shapes and/or patterns detectable from images captured by the camera 132. Such shapes and/or patterns are also referred to as a mask. The mask can be detected from image data captured by the camera 132 as regions of infrared radiation with differing intensities (e.g., a first region of radiation at a first intensity, and an adjacent region at a second intensity). The mask can be defined by the border between the above-mentioned regions.

In the illustrated example, the body 300 is formed from a core material (e.g., a polymer, a textile, or the like) with a first opacity to infrared radiation. The body 300 includes at least one opening 320, in addition to the openings 304 and

308. That is, the opening(s) 320 can be distinct from the clasping mechanism of the article 128. The opening(s) 320 have a second opacity to infrared radiation that is smaller than the opacity of the core material. For example, the openings 320 can extend through the body 300, and can therefore have a substantially null opacity to infrared radiation.

The article 128 can also include, as shown in FIG. 3A, a tag 324 affixed to the body 300 and bearing a data carrier, such as a barcode. The barcode can encode a target identifier, and each article 128 deployed in the facility may therefore bear a unique barcode, encoding a unique target identifier.

FIG. 3B illustrates an example image 328 captured by the camera 132, depicting the worker 116. As seen in FIG. 3B, the pigment or other material used to apply the barcode to the tag 324 may be substantially transparent to infrared radiation, and the barcode may therefore not appear in the image 328. Further, in some instances the barcode may be too small in the image 328 to reliably decode. The openings 320, however, are detectable in the image 328, due to the contrast between the openings 320 (which allow passage of infrared radiation generated by the worker 116) and the surrounding portions of the body 300 (which attenuate or block infrared radiation emitted by the worker 116). FIG. 3C illustrates a detailed view of a portion of the image 328, illustrating the machine-detectable contrast between the body 300 and the openings 320.

The openings 320 are shown as having star shapes, but can have any of a wide variety of shapes in other examples. For example, some articles 128 can have star-shaped openings 320 as shown in FIG. 3A, while other articles 128 can have triangular openings, square openings, or the like. Certain types of articles 128 can also have other structural features defining regions with different opacities to infrared radiation, such as regions of varying thickness, regions with IR-opaque or IR-transparent coatings, and the like. The masks defining the types of articles 128 deployed in a facility are selected to be distinguishable from one another in images captured by the camera 132.

FIGS. 4, 5, 11, and 12 illustrate various methods of dynamically determining associations between target identifiers and article identifiers. The methods illustrated in FIGS. 4-7 are discussed below in conjunction with their example performances by the computing device 120.

Figure 4:
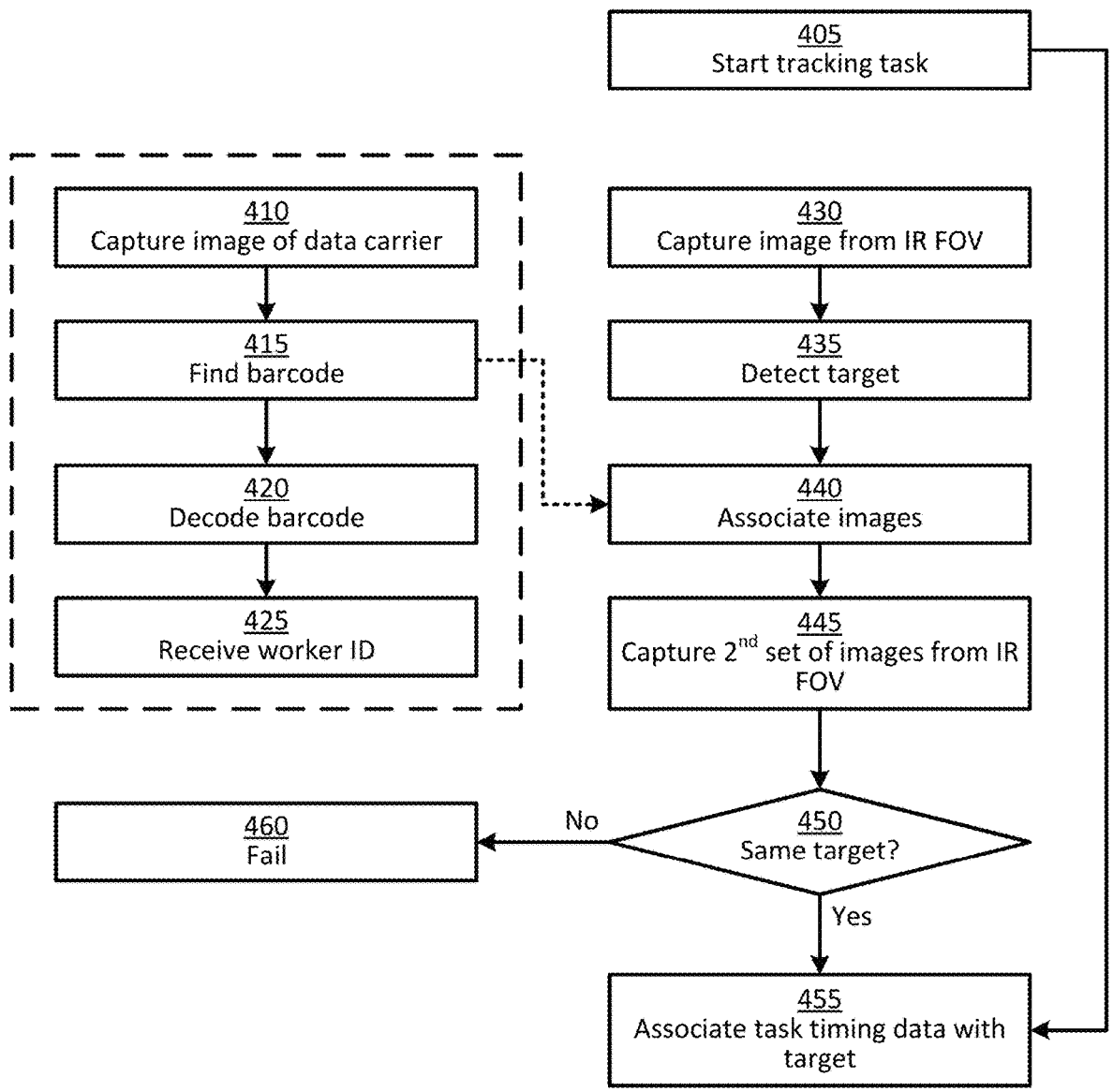
FIG. 4 is a flowchart of a method for tracking a target during performance of a task.

Referring to FIG. 4, at block 405, task data is chosen for a desired task, such as a task ID, a task start time, a selected worker ID of a worker selected to complete the task, and the like. At blocks 410 to 425, a reader 124 captures and decodes a worker ID from a data carrier. In an embodiment, the reader 124 captures an image of the data carrier at block 410, analyzes the captured image to find a barcode in the captured image at block 415, decodes data comprising the worker ID from the barcode at block 420, and transmits the worker ID to the computing device 120 at block 425. In an embodiment, the reader 124 transmits an RFID interrogation field and receives a backscattered response from an RFID tag within the field of interrogation, decodes the worker ID from the response, and transmits the worker ID to the computing device 120 at block 425. In an embodiment, the reader 124 decodes a worker ID from a magnetic stripe card and transmits the worker ID to the computing device at block 425. As explained above, capturing the worker ID from the data carrier may require the data carrier to be positioned in a reading zone adjacent to the reader 124.

At block 430, an IR camera 132 captures an IR image from an IR field of view 136. A person or other IR emitting target is detected from the captured IR image at block 435, and associated with the data carrier capture event at block 440. In an embodiment, the IR FOV 136 includes the reading zone adjacent to the reader that is required for the reader 124 to capture the worker ID from the data carrier, such that the captured IR image and the captured worker ID occur at approximately the same time, facilitating the association.

The IR camera 132 captures additional IR images creating a sequence of IR images from the IR field of view 136 in block 445. At block 450 the sequence of IR images is analyzed to determine whether a person detected from a second set of captured images is the same person detected from the initial set of captured images. When the determination is affirmative as indicated in block 455, timing data from the sequence of IR images is associated with the task data and the worker ID and stored in memory 204, processed via the execution of the application 208, and/or communicated with other computing devices as explained above.

When the determination is not affirmative the determination fails as indicated in block 460; this failure may be stored in memory 204, processed via the execution of the application 208, displayed on a user interface, and/or communicated with other computing devices. Even when the determination is not affirmative other methods of associating task timing data with the worker may be possible, such as reading the worker ID by the reader 124 again at the conclusion of the task, or applying person recognition algorithms to the captured sequence of IR images. It may be desirable to store the failure as part of the associated task timing data to facilitate later analysis. The determination of whether the person detected from the second set of captured images is the same person detected from the initial set of captured images may be done by any method, such as assuming that the field of view 136 is the same for both sets of images, determining that a location of the person within the first field of view is similar to a location of the person within the second field of view, determining that a motion vector of the person in the first set of images is consistent with a motion vector of the person in the second set of images, determining that a motion vector of the person in the second set of images is consistent with motion of a worker completing the assigned task, and so on.

Figure 5:
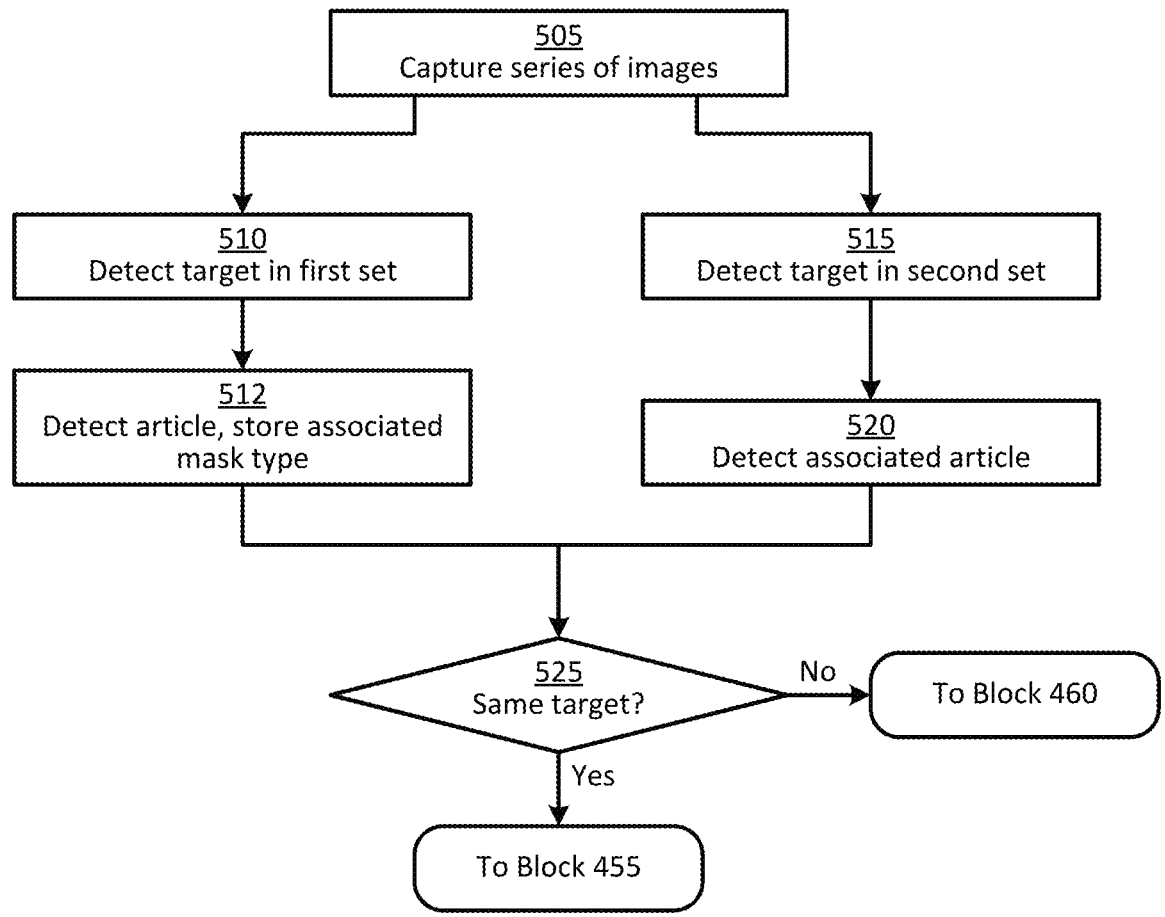
FIG. 5 is a flowchart of a method for annotating images during performance of the method of FIG. 4.

Referring to FIG. 5, in an embodiment, following capture of a series of images (block 505), determining whether the person detected from the second set of captured images is the same person detected from the initial set of captured images may be executed by detecting a second feature within the second set of captured IR images and considering the second detection when determining whether the persons are the same. First, the person or other target detected from the initial set of captured images is associated with a mask type at block 510.

This first association may be done in any of a variety of ways. The reader 124 may decode data from a data carrier carried by the article 128 worn by the worker, select a mask from a stored depository of known mask types based on the decoded data, decode a worker ID from a data carrier carried by the article 128, and associate the worker ID with the selected mask. The reader 124 may decode a type of object data from a data carrier carried by the article 128 worn by the worker, decode a worker ID from a data carrier carried by the article 128, and associate the worker ID with the selected type of object. A shape and/or pattern in the initial set of captured images resulting from the differential passage of infrared radiation from the worker 116 through an article 128 may be detected at block 512 and stored as the associated mask type. A shape and/or pattern in the initial set of captured images resulting from the differential passage of infrared radiation from the worker 116 through an article 128 may be detected, compared to a trained model to determine the mask type associated with the worker. When a person is detected from the second set of captured IR images at block 515, a feature detection algorithm may be applied at block 520 to detect a shape and/or pattern in the second set of captured images resulting from the differential passage of infrared radiation and to associate the detected mask with the trained model and/or the stored mask type. The second mask type of the detected mask in the second set of images is then compared, at block 525, to the mask type initially associated with the worker.

If the second mask type matches the first mask type it may be more likely that the persons are the same. If the second mask type cannot be determined, (e.g., no mask can be detected, no mask type can be determined by the trained model, the mask type determined by the trained model is below a required threshold, etc.) it may be less likely that the persons are the same. If the second mask type is determined to be different than the first mask type it may be much less likely that the persons are the same. This analysis can then be used as part of the decision criteria at block 450 to determine whether a person detected from a second set of captured images is the same person detected from the initial set of captured images.

Figure 6:
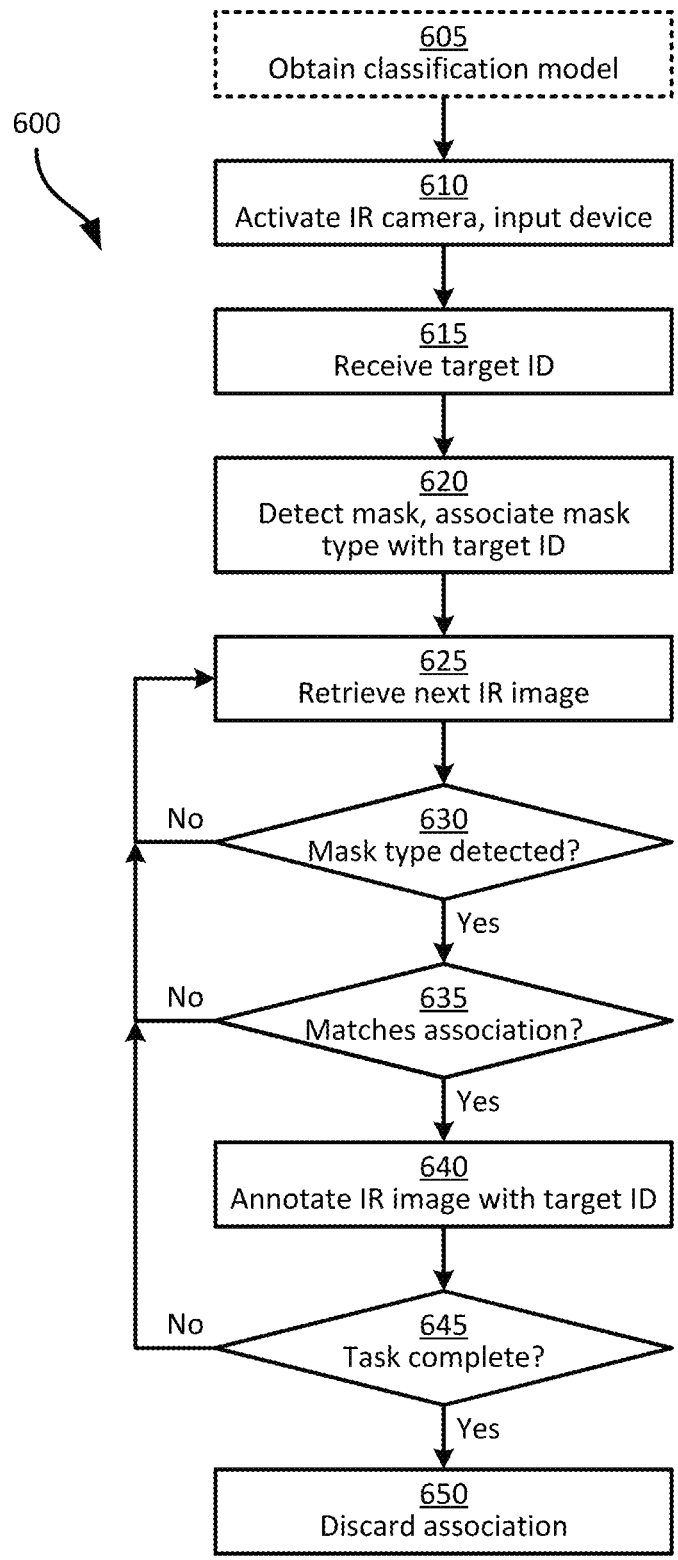
FIG. 6 is a flowchart of a method of dynamically determining associations between target identifiers and article identifiers.

Turning to FIG. 6, a method 600 of dynamically determining associations between target identifiers and article identifiers is illustrated. At block 605, the computing device 120 can be configured to obtain a classification model used to identify and distinguish articles 128 in images captured by the camera 132. While the remainder of the method 400 can be performed for each task monitored via sensor data, block 605 need not be performed for each task. For example, block 605 can be performed once in some examples, e.g., when the articles 128 are first deployed to the facility.

As noted earlier, a plurality of types of article 128 can be distributed among the workers or other identification targets in the facility. The computing device 120 uses the classification model to associate images from the IR camera 132 with a mask type, and to determine which types of article may have defined the shape and/or pattern of infrared radiation detected in the images. Obtaining the classification model at block 605 can include, for example, collecting a training set of images associated with the various types of articles 128, and deriving mask attribute sets from the training images.

Figure 7:
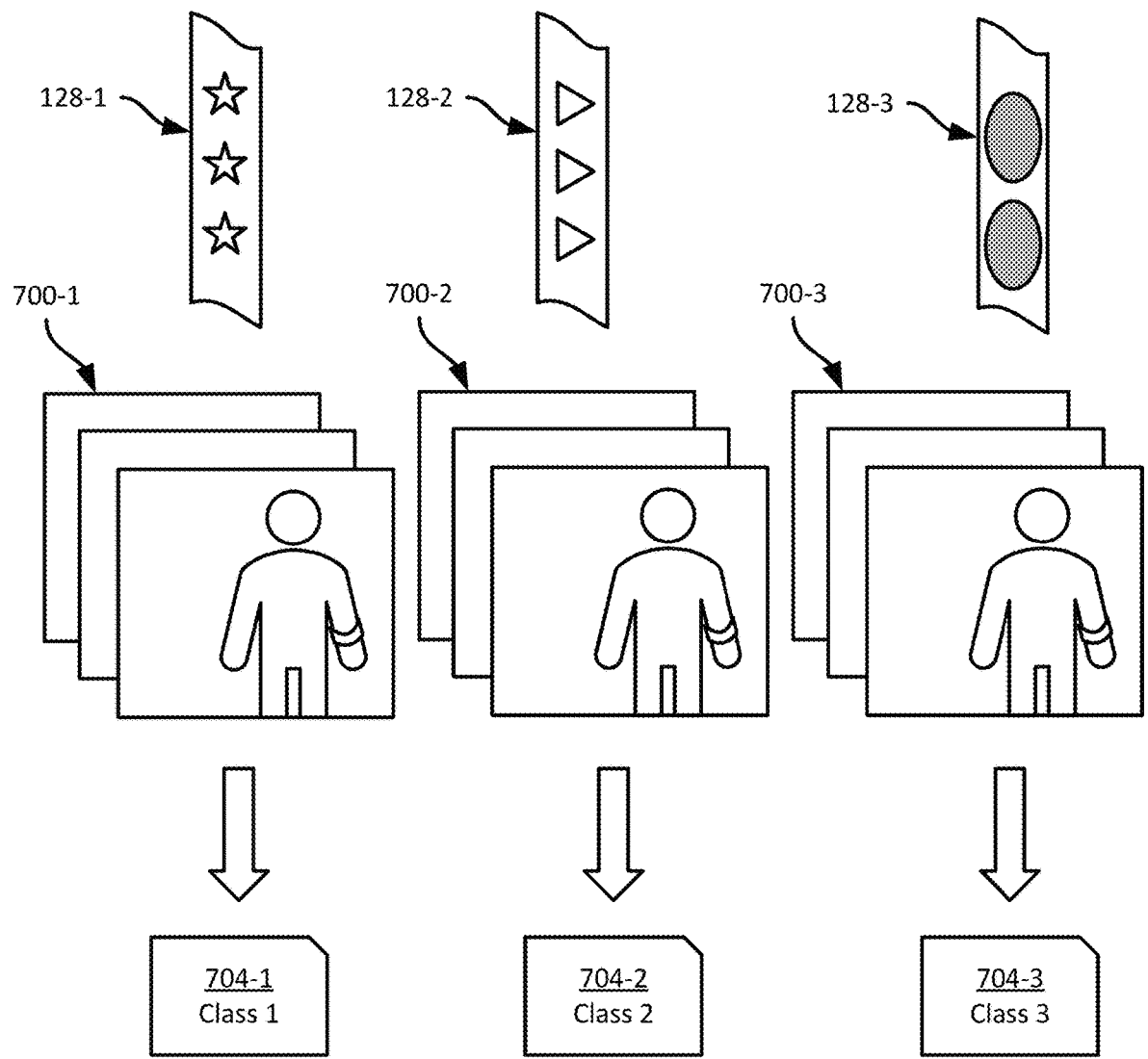
FIG. 7 is a diagram illustrating an example performance of block 605 of the method of FIG. 6.

Turning to FIG. 7, for example, three types of article 128 are shown. In particular, an article 128-1 includes star-shaped openings, an article 128-2 includes triangular openings, and an article 128-3 includes IR-opaque layers embedded in or applied thereon. Generating the classification model at block 605 can include collecting a plurality of images 700-1 of the article 128-1, and labelling the images 700-1 with an article identifier (e.g., "Class 1"). Each article 128-1 may carry a unique target identifier, but exhibit the same IR mask. The images 700-1 can depict instances of the article 128-1 in various orientations, on different subjects, and the like. Via a training process, a set of mask attributes 704-1 can be derived. The mask attributes 704-1 are attributes derivable from images captured by the camera 132 that, if observed in an image, indicate the likely presence of the article type 128-1 on the worker emitting the infrared radiation captured in that image.

Training sets of images 700-2 and 700-3 can also be collected, and mask attributes 704-2 and 704-3 can be derived for the article types 128-2 and 128-3. The mask attribute sets 704-1, 704-2, and 704-3 (collectively referred to as the mask attribute sets 704, and generically referred to as a mask attribute set 704) are stored with respective article types (e.g., "Class 1", "Class 2", and "Class 3") for subsequent use by the computing device 120. The attribute sets 704 can be used by the computing device 120 to determine whether an image from the camera 132 contains any of the mask types and/or to identify an article type (e.g., which class) to be associated with the image. The attribute sets 704 together define a classification model.

Returning to FIG. 6, at block 610, the computing device 120 may be configured to activate the input device 124 and/or the camera 132. The nature of the activation at block 610 varies with the form in which the input device 124 and the camera 132 are implemented. In the example system shown in FIG. 1, where the input device 124 and the camera 132 are components of the robot 130, the input device 124 and the camera 132 may be activated by an on-board controller of the robot 130, e.g., in response to receiving a command from the computing device 120 to travel to a given location in the facility. In other examples, either or both of the input device and the camera 132 can be activated directly by the computing device 120, e.g., in cases where the camera 132 is mounted in a fixed location in the facility and connected directly to the computing device 120, rather than via an intermediate controller such as the robot 130.

At block 615, the computing device 120 is configured to receive a target identifier, such as a worker ID, from the input device 124. For example, in embodiments using the robot 130, the computing device 120 can be configured to assign a task (e.g., package three items 108 into an item 112, and place the packaged items in the receptacle 132) to the robot 130. The robot 130 can, in turn, present the task on a display mounted to the chassis 134. The worker 116 may claim the task (e.g., indicating that the worker 116 will perform the task) by approaching the robot 130 and reading a data carrier associated with the article 128 worn by the worker with the input device 124.

Figure 8:
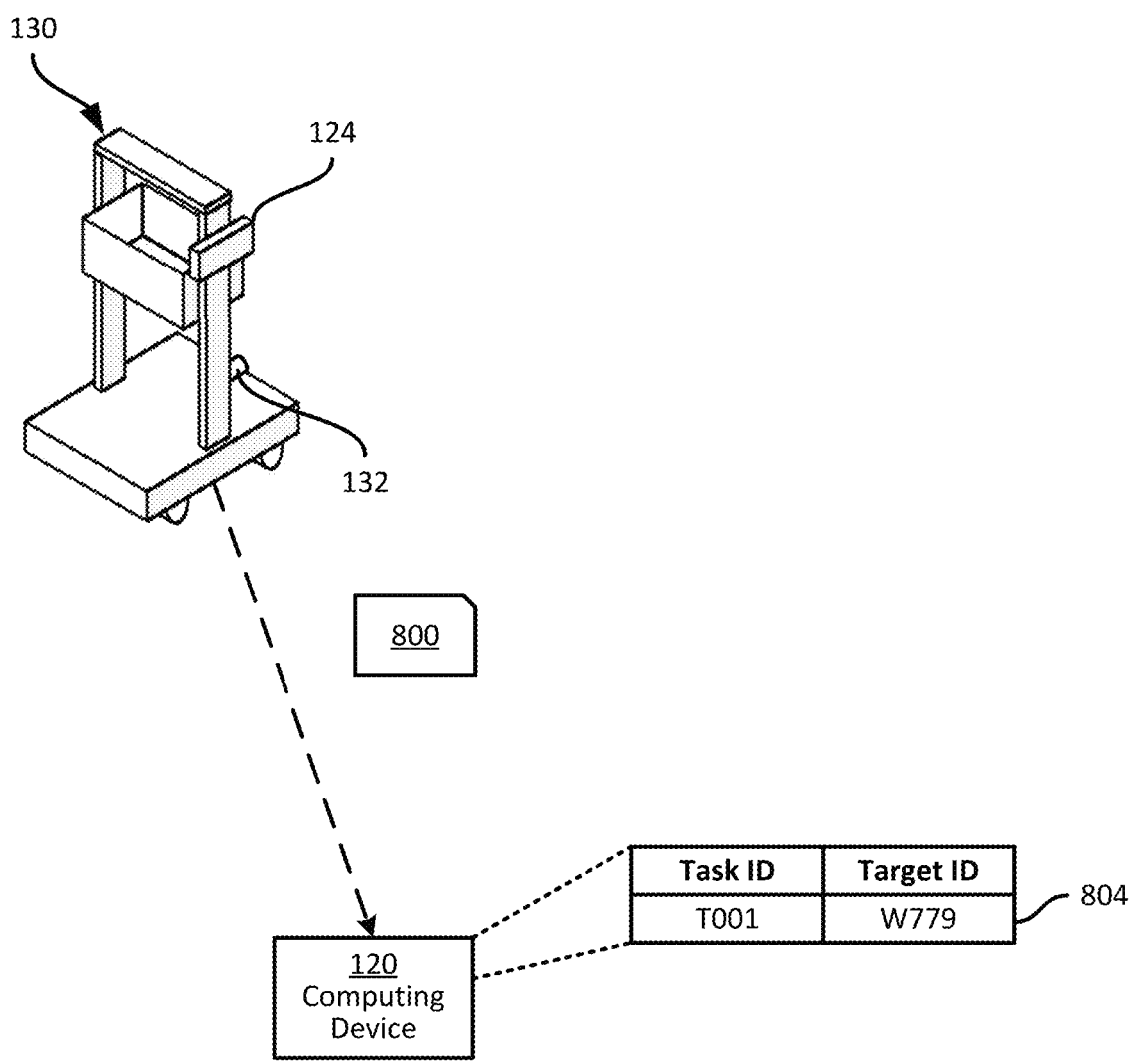
FIG. 8 is a diagram illustrating an example performance of block 615 of the method of FIG. 6.

Upon capturing the target identifier (also known as target ID or worker ID) from the data carrier associated with the article 128 via the input device 124, the robot 120 may be configured to transmit the target identifier to the computing device 120. In some examples, the robot 130 can transmit the target identifier to the computing device 120 along with a task identifier corresponding to the task claimed by the worker 116. FIG. 8 illustrates an example performance of block 615, in which the robot 130 captures the target identifier "W779", e.g., from the barcode of a specific article 128 worn by the worker 116. The robot 130 can be configured to send a message 800 to the computing device 120 containing the target identifier, as well as an associated task identifier "T001". The task identifier may have been previously assigned to the robot 130 by the computing device 120. The computing device 120 is configured, in response to receiving the target and task identifiers, to store the target identifier and the task identifier in association with one another, e.g., in a record 804 in the memory 204.

Returning to FIG. 6, at block 620 the computing device 120 is configured to detect the mask from an image captured by the camera 132. The computing device 120 may be further configured to determine the type of article (e.g., the class as discussed above) of the article 128, and to associate that type of article with the target identifier from block 615.

Figure 9:
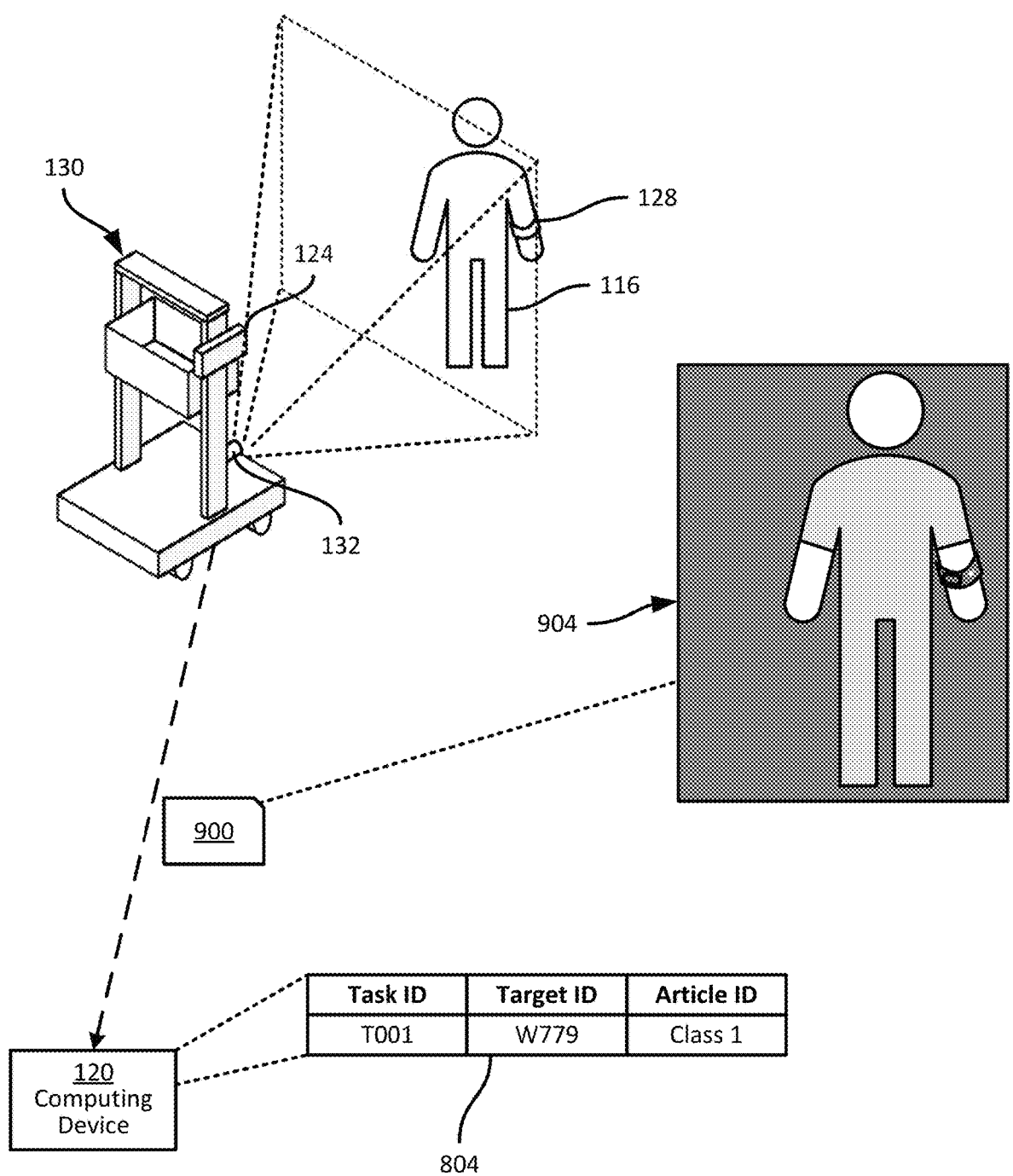
FIG. 9 is a diagram illustrating an example performance of block 620 of the method of FIG. 6.

As shown in FIG. 9, following receipt of the target identifier at block 615, the computing device 120 can be configured to monitor images from the IR camera 132, e.g., transmitted to the computing device 120 as a video stream 900. The computing device 120 can process each image in the stream, such as an example image 904 using the classification model discussed in connection with FIG. 7, to determine whether the image contains any masks, and to determine the type of article (e.g., the class, in this example) of any mask detected in the image.

When a mask is detected in an image of the stream (e.g., in the image 904), the computing device 120 is configured to store the mask type and/or type of article in the record 804, in association with the target identifier. In the example shown in FIG. 9, the type of article "Class 1" is therefore stored in association with the target identifier "W779", indicating that the worker having the identifier "W779" is currently wearing a Class 1-type wristband (e.g., with star-shaped openings 320).

In some examples, the computing device 120 can be configured to verify that the type of article obtained at block 620 is obtained from a similar location within the facility, and/or at a similar time, as the target identifier that was obtained at block 615. In the present example, the co-location of the input device 124 and the camera 132 on the robot 130 increases the likelihood that a target identifier detected by the input device 124, and a mask detected in an image from the camera 132 within a certain time period (e.g., within five seconds of the target identifier being obtained) both correspond to the same article 128.

In some examples, the computing device 120 can also be configured to process each image in the stream 900 to determine whether a person is present in the image. For example, a segmentation algorithm such as You Only Look Once (YOLO) can be executed at the computing device 120 to determine whether any regions of the image contain a person. When no person is detected within the image 904, the computing device 120 may discard the image 904, and/or process the next image in the stream 900.

Following the performance of block 620, an association is established between an article 128 (of which there may be many of the same type deployed in the facility) and a specific worker 116. As discussed below; the computing device 120 can then annotate further images in the stream 900 to associate those images with that specific worker 116, without repeating the capture of the target identifier corresponding to the worker 116 (e.g., without necessitating a further scan of the article 128 at the input device 124).

At block 625, the computing device 120 is configured to continue processing images in the stream 900, e.g., in time-sequenced order (that is, in order of capture). Having selected the next image in the stream 900, at block 630 the computing device 120 is configured to determine whether a mask type is detected in the image. For example, the computing device 120 can process the image using the classification model discussed in connection with FIG. 7, to determine whether any of the attribute sets 704 are present in the image. In some examples, the computing device 120 can also be configured to detect a region of the image containing infrared radiation received from an identification target such as a person, e.g., via a suitable segmentation and/or object detection algorithm.

When the determination at block 630 is negative, the computing device 120 can retrieve the next image in the stream 900, and repeat the determination at block 630 for the next image. When the determination at block 630 is affirmative, however, the computing device 120 can proceed to block 635.

At block 635, the computing device 120 is configured to determine whether the mask type detected at block 630 matches the association stored at block 620. In the present example performance of the method 600, the computing device 120 can therefore be configured to determine whether the type of article from block 630 is "Class 1". If the determination at block 635 is negative, indicating that a different mask type was detected in the next image from the stream 900, the image may be discarded and the computing device 120 can return to block 625. The detection of a different mask type (e.g., a mask type associated with a type of article of the type "Class 2") in an image may indicate the presence of a different worker in the field of view 136. The other worker (different from the worker 116 to which the target identifier from block 615 corresponds) may have no involvement in the task being performed by the target worker 116, and it may therefore be unnecessary to track the movements of that worker.

In some examples, more than one mask may be detected in a given image 904 from the stream 900. The determination at block 635 can be performed by the computing device 120 for each mask detected in the image, and any non-matching images may be discarded, while a matching mask (if present) may be handled by proceeding to block 640.

At block 640, following detection of a mask type in an image that matches the association established at block 620, the computing device 120 can be configured to annotate the image with the target identifier, according to the association. In other words, the computing device 120 can associate an image with a target identifier, despite not having scanned or otherwise obtained the target identifier contemporaneously with the image.

Figure 10:
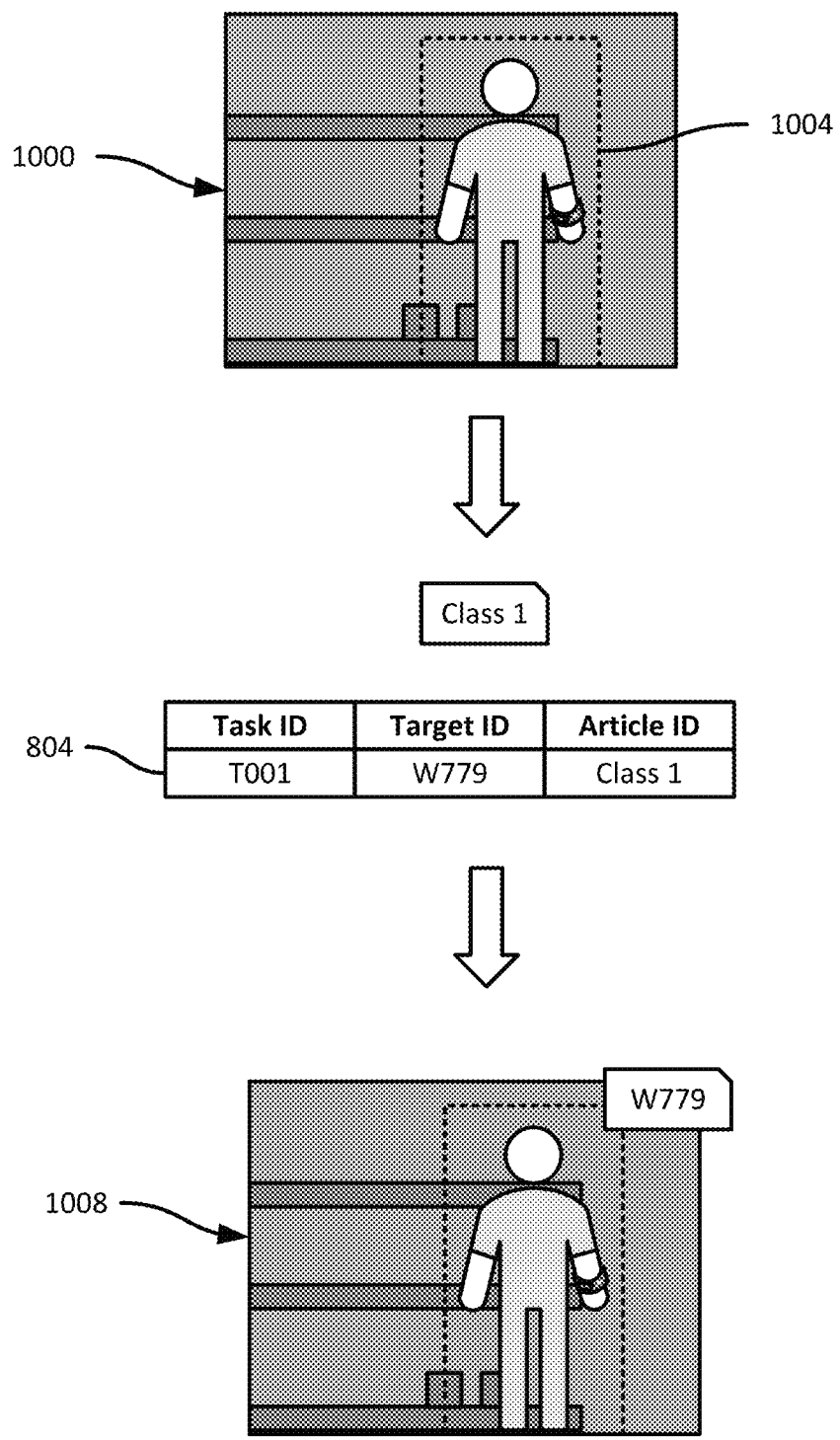
FIG. 10 is a diagram illustrating an example performance of blocks 625 to 640 of the method of FIG. 6.
Figure 11:
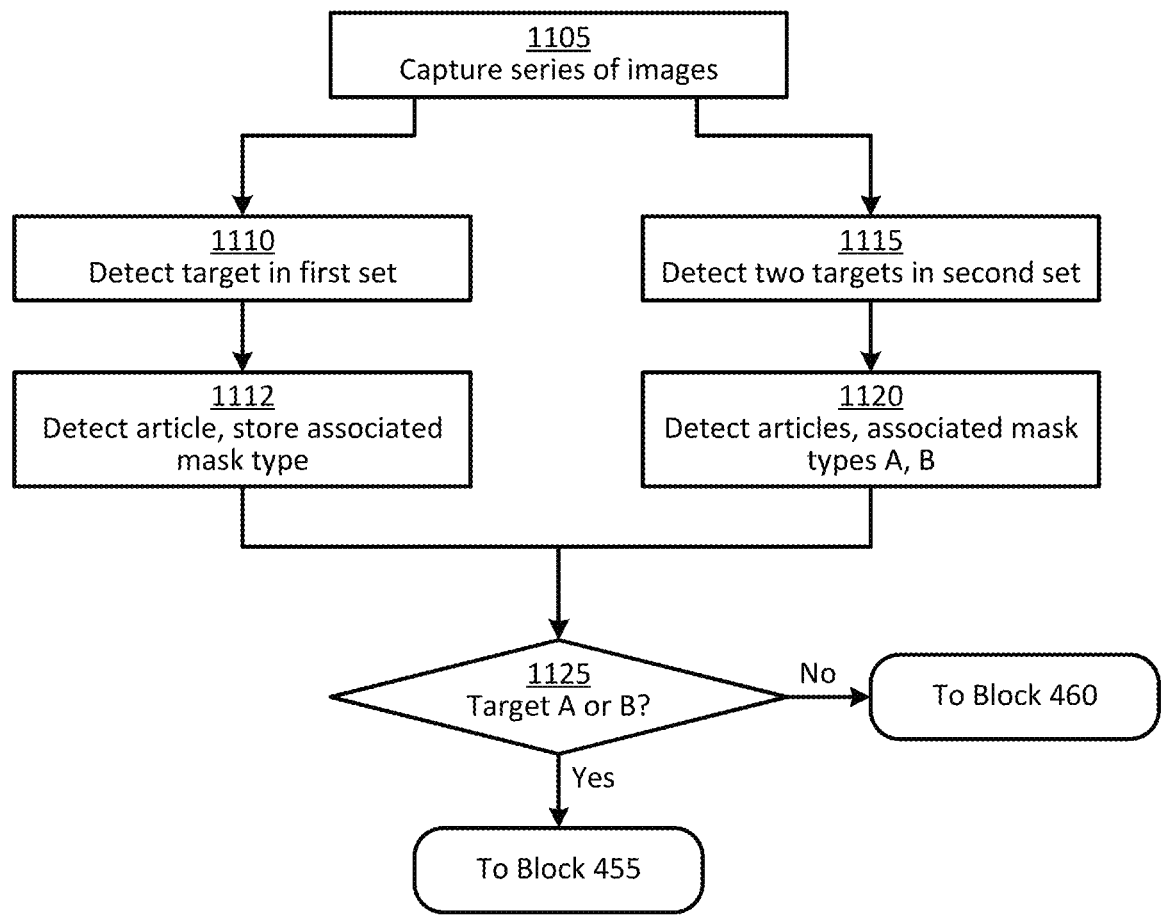
FIG. 11 is a flowchart of a method for annotating images during another example performance of the method of FIG. 4.

Turning to FIG. 10, an example performance of blocks 625-640 is illustrated. For example, the computing device 120 selects an image 1000 from the stream 900, and at block 630 determines that the image 1000 contains a mask type associated with an article having the article identifier "Class 1". The computing device 120 can also identify a bounding box or other region 1004 containing the detected mask.

Referring to the record 804, at block 635 the computing device 120 determines that the mask type from the image 1000 matches the mask type stored at block 620. The computing device 120 therefore annotates the image 1000 with the target identifier from the record 804 at block 640. For example, the computing device 120 can generate an annotated image 1008 containing, e.g., as metadata or the like, the target identifier "W779" in association with the region 1004. The annotated image 1008 can be stored in the memory 204, e.g., for subsequent processing to detect and time subtasks.

Returning to FIG. 6, at block 645 the computing device 120 is configured to determine whether the task associated with the current performance of the method 600 is complete. The determination at block 645 can include determining, for example, whether a further scan of the target identifier has been captured at the input device 124. Other task completion indicators resulting in an affirmative determination at block 645 are also contemplated, such as a selection (e.g., by the worker 116) of a user interface element on a graphical user interface presented by the robot 130. When the determination at block 645 is negative, the computing device 120 is configured to continue processing images in the stream 900, and annotating any images with the same article identifier as in the association from block 620.

When the determination at block 645 is affirmative, the computing device 120 can proceed to block 650, and discard the association from block 620. For example, the computing device 120 can delete the record 804 from the memory 204.

The annotated images produced via the method 600 can subsequently be processed for task detection and/or other functions.

The methods explained here may be well suited to determining timing data from long or complex tasks. For example, referring to FIG. 11, consider a series of images captured at block 1105. A first set of images from the series may be analyzed to detect a target (block 1110) such as a worker and a worker mask type (block 1112) and to associate the worker mask type with the worker 116 detected at block 1110. A second set of images from the series may be analyzed to detect two targets, such as a first person and a second person (block 1115). At block 1120, a first mask may be detected within an image zone of the first person and associated with a first mask type "A", while a second mask may be detected within an image zone of the second person and associated with a second mask type "B". Comparing the first mask type and the second mask type with the worker mask type at block 1125 may improve the determination of which person, if any, is the worker 116 associated with the target ID, e.g., at block 440. When the first mask type cannot be determined and the second mask type is different than the worker mask type it may be likely that the first detected person from block 1115 is the targeted worker 116. When the first mask type is the same as the worker mask type and the second mask type is different than the worker mask type, it may be more likely that the first detected person is the targeted worker 116. When no mask is detected for the first person and the second mask type cannot be determined it may be likely that the second detected person is the targeted worker. Other likelihoods may be determined based on mask types, type of objects, task data, or other considerations in certain scenarios.

Figure 12:
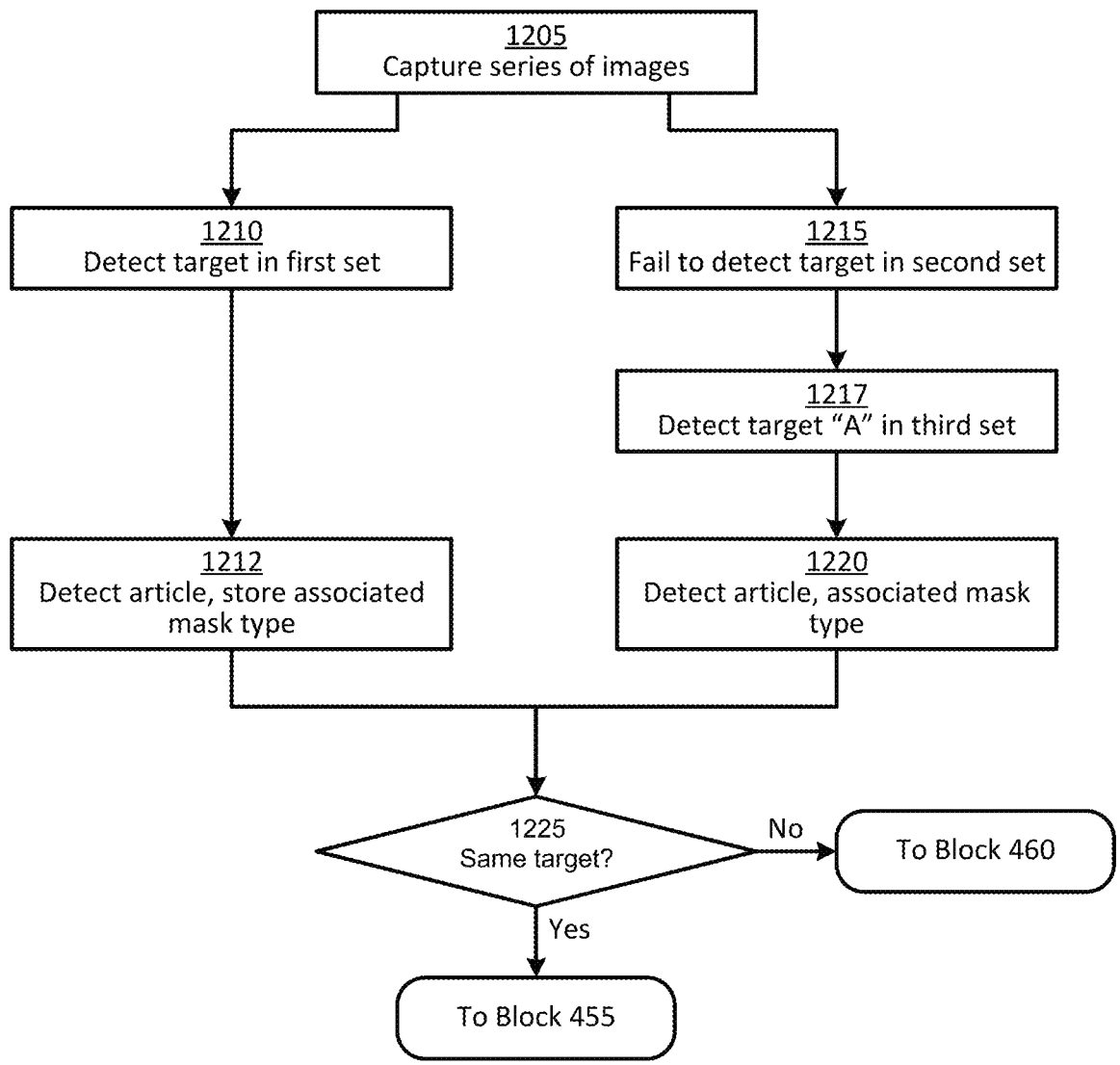
FIG. 12 is a flowchart of a method for annotating images during a further example performance of the method of FIG. 4.

As an additional example, referring to FIG. 12, consider a series of images captured at block 1205. A first set of images from the series may be analyzed at block 1210 to detect a target (block 1210) such as a worker and a worker mask type (block 1212) and to associate the worker mask type with the worker 116 detected at block 1210. A second set of images from the series may be analyzed at block 1215 without detecting any person or other target. A third set of images from the series may be analyzed at block 1217 to detect a target, such as a person "A". Conventional object detection algorithms based on only object tracking and/or motion may be unable to determine if the person detected in the third set of images at block 1217 is the worker detected in the first set of images. A second mask may be detected within an image zone of the person in the third set of images at block 1220, and a second mask type may be determined for the second mask. The computing device 120 may then compare the first mask type to the second mask type at block 1225 to determine whether the person in the third set of images is the same person as the worker in the first set of images.

When the first mask type is the same as the second mask type and the same as the worker mask type, it may be likely that the person detected in the third set of images is the targeted worker 116. When no mask is detected in the third set of images it may be less likely that the person detected in the third set of images is the targeted worker 116. When the mask type determined from the third set of images is different than the first mask type it may be very unlikely that the person detected in the third set of images is the targeted worker. Other likelihoods may be determined based on mask types, type of objects, task data, field of view, or other considerations in certain scenarios.

Other systems may be apparent to one skilled in the art based on the teaching here. A target worker 116 generating infrared radiation within a field of view 136 of an infrared camera 132 may be a human person, or may be some other warm-blooded mammal such as a beagle working as a K9 sniffer helping to seize food or drugs at a point of entry. The field of view 136 may be changed by manipulating the infrared camera 132 by the robot 130, by a robotic arm, by a drive wire device, by panning tilting or zooming the camera 132, by software commands to alter the resolution of the captured image, or by repositioning a tripod on which the camera 132 is mounted. The field of view 136 of the infrared camera 132 may overlap the read range for a barcode scanner, industrial vision camera, bioptic scanner, or other reader (e.g., the input device 124). The data carrier reader 124 may be mobile while the infrared camera 132 may be fixed. In other examples, the infrared camera 132 may be mobile while the data carrier reader 124 may be fixed, both may be fixed, both may be mobile on the same platform, or each may separately mobile. The wearable article 128 may be a wristband, collar, hat, visor, vest, lanyard, spectacles, or electronic device. Processing images of the image sequence can include skipping or pre-processing at least one image of the image sequence. One or more mask types detected from a captured image may be associated with an individual article identifier.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C": "one or more of A, B, and C": "at least one of A, B, or C": "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for tracking a target within a field of view, the method comprising:
   receiving, from an input device, a target identifier uniquely identifying the target;
   receiving, from an infrared camera, a sequence of images resulting from infrared radiation received from the target and comprising a first region of radiation received from the target at a first intensity and an adjacent region of radiation received from the field of view at a second intensity;
   detecting, in a reference image from the sequence of images, a mask defined by a border between the first region and the adjacent region;
   storing an association between the target identifier and the mask;
   detecting the mask in another image from the sequence of images; and
   annotating the another image with the target identifier according to the stored association.

2. The method of claim 1, wherein the infrared radiation received from the field of view at the second intensity less than the first intensity.

3. The method of claim 1, further comprising:
   storing a plurality of mask attribute sets, and a respective article identifier for each mask attribute set;
   wherein detecting the mask includes detecting one of the mask attribute sets.

4. The method of claim 3, wherein the plurality of mask attribute sets includes a classification model; and
   wherein detecting the mask includes applying the classification model to the another image.

5. The method of claim 3, wherein detecting the mask in the another image from the sequence of images includes:
   for each image in the sequence of images, determining whether the image contains any of the mask attribute sets; and
   when the determination is affirmative, determining that the mask attribute set corresponds to the article identifier associated with the target identifier.

6. The method of claim 1, further comprising:
   detecting the target in a region of the another image; and
   annotating the another image by storing the target identifier in association with the region of the another image.

7. The method of claim 1, further comprising:
   receiving a task completion indicator; and
   discarding the association between the target identifier and the mask.

8. The method of claim 7, wherein the task completion indicator includes receiving the target identifier from the input device.

9. The method of claim 1, wherein the input device includes a barcode scanner, the barcode scanner having a read range overlapping with the field of view.

10. A computing device for tracking a target within a field of view, the computing device comprising:
- a memory; and
- a processor configured to:
  - receive, from an input device, a target identifier uniquely identifying the target;
  - receive, from an infrared camera, a sequence of images resulting from infrared radiation received from the target and comprising a first region of radiation received from the target at a first intensity and an adjacent region of radiation received from the field of view at a second intensity;
  - detect, in a reference image from the sequence of images, a mask defined by a border between the first region and the adjacent region;
  - store an association between the target identifier and the mask;
  - detect the mask in another image from the sequence of images; and
  - annotate the another image with the target identifier according to the stored association.

11. The computing device of claim 10, wherein the infrared radiation received from the field of view at the second intensity is less than the first intensity.

12. The computing device of claim 10, wherein the processor is further configured to:
- store a plurality of mask attribute sets, and a respective article identifier for each mask attribute set; and
- detect the mask by detecting one of the mask attribute sets.

13. The computing device of claim 12, wherein the plurality of mask attribute sets includes a classification model; and
- wherein the processor is configured to detect the mask by applying the classification model to the another image.

14. The computing device of claim 12, wherein the processor is configured to detect the mask in the another image from the sequence of images by:
- for each image in the sequence, determining whether the image contains any of the mask attribute sets; and
- when the determination is affirmative, determining that the mask attribute set corresponds to the article identifier associated with the target identifier.

15. The computing device of claim 10, wherein the processor is further configured to:
- detect the target in a region of the another image; and
- annotate the another image by storing the target identifier in association with the region of the another image.

16. The computing device of claim 10, wherein the processor is further configured to:
- receive a task completion indicator; and
- discard the association between the target identifier and the mask.

17. The computing device of claim 16, wherein the task completion indicator includes receiving the target identifier from the input device.

18. The computing device of claim 10, wherein the input device includes an RFID reader, the RFID reader having a read range overlapping with the field of view.

* * * * *